Dec. 17, 1963   O. H. MATHISEN   3,114,352
POINTERS
Filed Sept. 11, 1961

INVENTOR.
OSCAR H. MATHISEN
BY
Arnold and Roylance

United States Patent Office 3,114,352
Patented Dec. 17, 1963

3,114,352
POINTERS
Oscar H. Mathisen, 330 Windsor, Glen Ellyn, Ill.
Filed Sept. 11, 1961, Ser. No. 137,176
3 Claims. (Cl. 120—89)

This invention relates to pointers of the type adapted to point the lead of a pencil or compass upon relative movement between the pointer and the lead.

One of the objects of the invention is to provide a pointer which is simple in construction, easy to use and cheap to produce so that after prolonged use it can be disposed of. Another object is to provide a pointer which is operative to point a lead to a predetermined angle.

Still another object is to provide an improved pointer which is operative to point a lead upon relative movement between the pointer and the lead.

In order that the manner in which these and other objects are attained in accordance with the invention can be understood in detail, reference is had to the accompanying drawing, which forms a part of this specification, and wherein.

Figure 1:
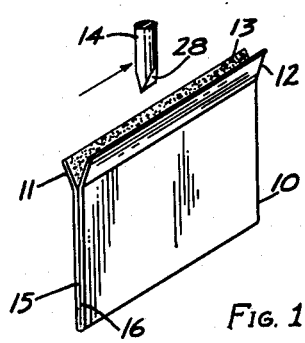
FIGURES 1 and 2 are perspective views of two embodiments of the invention.

Referring now to the drawings, the embodiment illustrated in FIGS. 1, 3, 4 and 5 comprises a flat rectangular body portion 10, a pair of elongated, rectangular flaps 11 and 12 which extend along one edge of the body portion, and abrasive means 13 on the flaps. Flaps 11 and 12 diverge at an angle corresponding to that at which a lead 14 is to be pointed and have adjacent flat surfaces upon which abrasive means 13 is located, the surfaces intersecting along a straight line substantially coincident with the straight edge of body portion 10 along which the flaps extend.

Body portion 10 comprises a pair of panels 15 and 16 integral with flaps 11 and 12, respectively, the panels and flaps being of sheet material such as paperboard, plastic or metal. Panels 15 and 16 are flat and rectangular and are secured together in a back-to-back relationship. Dependent upon the materials, the panels can be secured by adhesives, by fused metal such as solder, or by fusion of the panels through the use of solvents, heat, pressure or electricity.

Abrasive means 13 comprises two flat strips 17 and 18 of a flexible backing having bonded thereto abrasive particles or grit, such as emery cloth or sandpaper. Strips 17 and 18 are elongated and rectangular and are secured to flaps 11 and 12, respectively, such as by being glued, the strips each having a width slightly less than the width of the flap to which it is secured.

Figure 5:
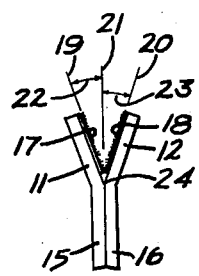
FIGURE 5 is a detail end view, on an enlarged scale relative to that of FIGURE 1, of the embodiment of FIGURE 1.

With reference to FIG. 5, the exposed abrasive particles of strips 17 and 18 lie substantially in planes 19 and 20, respectively, which diverge from the plane 21 of body portion 10 at angles 22 and 23, respectively, angles 22 and 23 being substantially equal. Panels 15 and 16 are secured at least along those portions adjacent to the flaps so that, when lead 14 is pointed, it will not wedge or tear the panels apart at 24. Angles 22 and 23 are maintained by the stiffness and rigidity of the flaps; however, the stiffness should not be so great that the flaps cannot be pinched toward each other to produce small angles of pointing.

Figure 3:
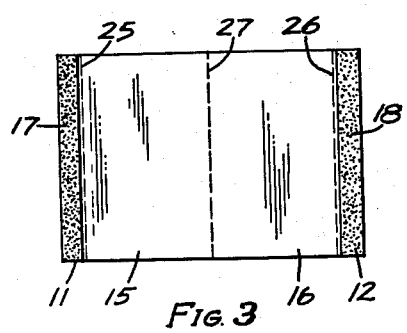
FIGURE 3 is a top plan view of the embodiment of FIGURE 1 illustrating the pointer prior to its being folded.
Figure 4:
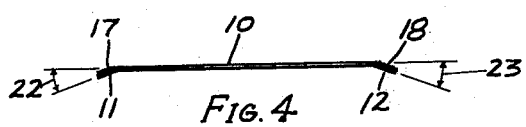
FIGURE 4 is a side view of the device of FIGURE 3 illustrating the pointer in a partially folded condition.

With reference to FIGS. 3 and 4, the pointer of FIG. 1 can be constructed by securing strips 17 and 18 along opposite ends of a flat, elongated, rectangular blank. The blank is then folded along lines indicated by dotted lines 25 and 26 to form flaps 11 and 12, the flaps lying in planes which are at equal angles 22 and 23 relative to body portion 10. Then, the blank is folded or bent along a transverse medial line, indicated by dotted line 27, to form panels 15 and 16 which are then secured together so that the flaps diverge as shown in FIG. 5.

In use, the pointer is held in one hand as by grasping body portion 10 between the thumb and index finger and the lead is supported by the other hand. Lead 14 is engaged with abrasive means 13 and by causing relative movement therebetween, either by movement of only the lead, or of only the pointer or of both the lead and the pointer, the lead will be pointed to the desired angle by abrasion. If the relative movement is only longitudinal, the lead will be abraded to a wedge point 28 (FIG. 1) and, if the movement is rotational, either with or without concurrent longitudinal movement, a conical point 29 (FIG. 2) will be formed.

It is contemplated that the pointers be relatively small so that they will be easy and handy for a draftsman to use. Thus, body portion 10 can be approximately one each wide and one and one-half inches long and flaps 11 and 12 and strips 17 and 18 can be approximately one-quarter of an inch wide and one and one-half inches long. The width of strips 17 and 18 corresponds to the length of that portion of lead 14 which is to be abraded. With such a "small" pointer, it may be necessary to make several passes of the lead along the pointer to obtain the desired degree of sharpness.

Figure 2:
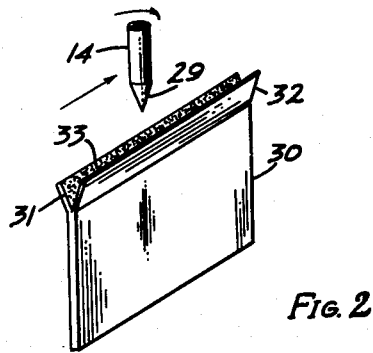

The embodiment illustrated in FIG. 2 comprises a body portion 30, a pair of flaps 31 and 32 and abrasive means 33. This embodiment differs from that shown in FIG. 1 only in the construction of body portion 30. Body portion 30 is of a single, flat, rectangular panel. This construction can be advantageously formed by extruding suitable plastic material so that flaps 31 and 32 are formed integral with body portion 30 and diverge at the desired angle without having to bend or permanently deform a blank.

Figure 6:
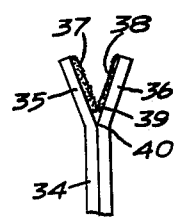
FIGURES 6–8 are detail end views, similar to FIGURE 5, illustrating different ways of constructing details.

With reference to FIG. 6, there is shown a pointer comprising a body portion 34 having a pair of divergent flaps 35 and 36 extending along one edge thereof. Abrasive particles 37 and 38 are coated on or bonded directly to flaps 35 and 36 and cover elongated rectangular areas of the flaps. Flaps 35 and 36 are resilient and, in the absence of the abrasive particles, would abut each other; however, abrasive particles 37 and 38 abut each other at a point 39 which is sufficiently close to the hinge point 40 of the flaps so that the flaps are held apart against their own bias at the desired angle.

Figure 7:
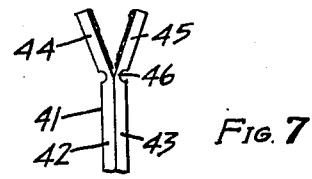

The pointer illustrated in FIG. 7 includes a body portion 41 having a pair of panels 42 and 43 joined together. Panels 42 and 43 are integral with divergent flaps 44 and 45, respectively. Body portion 41 and flaps 42 and 43 are of a sheet material that can be crimped, as indicated at 46, so that the flaps are held at the desired angle.

Figure 8:
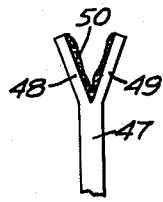

With reference to FIG. 8, there is shown a pointer having a body 47 and a pair of divergent flaps 48 and 49 which are coated by abrasive particles 50 which cover the entire area of the adjacent surfaces of the flaps, as opposed to lying along strips on each flap.

While a plurality of embodiments have been disclosed, it is to be understood that the invention is not limited thereto and that other arrangements can be made without departing from the scope of the invention as defined in the appended claims.

What is claimed is:

1. In a pointer for leads, the combination of
a first portion of relatively stiff flat flexible material,
a second portion of relatively stiff flat flexible material,
said first and second portions each being of substantially the same size and each having a straight elongated edge and an integral rectangular flap defined by a fold line parallel to said straight edge,
areas of said first and second portions on the side of said fold lines opposite said flaps being disposed in facing relationship and adhesively secured together to provide a flat body, said flaps projecting therefrom to define a channel of V-shaped cross-section;
the width of said body being substantially greater than the width of said flaps so that said body can be conveniently held in one hand, and
abrasive means on the adjacent facing surfaces of said flaps,
said flexible sheet material having sufficient resiliency at said fold lines to normally bias said flaps one toward the other to maintain said channel of V-shaped cross-section.

2. A pointed for leads in accordance with claim 1 and wherein
said abrasive means comprises two abrasive layers each of material thickness and each fixed to a different one of said flaps,
said abrasive layers engaging each other adjacent said fold lines to space said flaps angularly apart against the normal bias of said sheet material at said fold lines.

3. A pointer for leads in accordance with claim 1 in which
said first and second portions are integral with each other, being a single rectangular sheet of material having a medial fold line that is parallel with the said straight edges of said first and second portions, and
said body provided by adhesively securing areas of said first and second portions together is rectangular, said rectangular body having a length equal to the length of said flaps.

References Cited in the file of this patent

UNITED STATES PATENTS

D. 5,183 Kennedy _____ Aug. 8, 1871

FOREIGN PATENTS 819,514 Germany _____ Oct. 31, 1951